United States Patent [19]
Burnham

[11] Patent Number: 4,764,785
[45] Date of Patent: Aug. 16, 1988

[54] VIEWFINDER

[75] Inventor: William L. Burnham, Leroy, N.Y.

[73] Assignee: Eastman Kodak Company, Rochester, N.Y.

[21] Appl. No.: 143,421

[22] Filed: Jan. 13, 1988

[51] Int. Cl.<sup>4</sup> ............................................. G03B 13/02
[52] U.S. Cl. .................................................... 354/219
[58] Field of Search ............... 354/219, 221, 222, 223; 33/266

[56] References Cited

U.S. PATENT DOCUMENTS

| | | | |
|---|---|---|---|
| 2,841,064 | 7/1958 | Bagby et al. | 354/449 |
| 3,073,223 | 1/1963 | Stimson | 354/460 |
| 4,216,589 | 8/1980 | Beaver | 354/219 |
| 4,634,253 | 1/1987 | Tamamura | 354/403 |

FOREIGN PATENT DOCUMENTS

| | | | |
|---|---|---|---|
| 275071 | 6/1914 | Fed. Rep. of Germany | 354/219 |
| 558797 | 12/1929 | Fed. Rep. of Germany | 354/219 |
| 184311 | 6/1963 | Sweden | 354/219 |

Primary Examiner—A. A. Mathews
Attorney, Agent, or Firm—Roger A. Fields

[57] ABSTRACT

A viewfinder for indicating substantially how much of a subject an objective lens projects on to the film in a camera comprises a frame for viewing the portion of the subject to be recorded on the film. The frame includes a lattice like arrangement of spaced light baffles which define relatively small viewing openings between the baffles for viewing the subject through the openings. Each of the light baffles has a length which is sufficient with respect to the optical axis of the the objective lens to block from view ambient light reflected to the viewing openings from outside the portion of the subject the lens projects on to the film. Thus when the eye is brought relatively close to the lattice like arrangement the view through the viewing openings will be substantially coincident with the portion of the subject recorded on the film, since the area outside that portion will appear blackened. This effect is achieved without having to center the eye with respect to the lattice like arrangement.

12 Claims, 5 Drawing Sheets it is to be understood that other elements not specifically shown or described may take various forms known to persons of ordinary skill in the art.

VIEWFINDER

BACKGROUND OF THE INVENTION

1. Field of the Invention

The invention relates generally to the field of photography and more particularly to a viewfinder for indicating substantially how much of a subject an objective lens projects on to the film in a camera.

2. Description of the Prior Art

When taking a picture it is necessary to know not only in what direction to aim the camera but also how much of the subject will be included in the picture. For this reason practically every camera has as viewfinder of some kind.

A viewfinder known as a "frame finder" is one of the simplest types of viewfinders. Typically, the frame finder consists of a front frame and a small rear peep-sight, each of which corresponds in shape to the negative. The frame is mounted on or built into the camera above the objective lens and in the same plane as the lens, and the peep-sight is mounted on or built into the camera in the same plane as the film. The viewing axis of the frame and peep-sight is parallel to the optical axis of the lens.

When the eye is brought close to the aperture of the rear peep-sight, the view bounded by the front frame is almost exactly the same as the taking field of the objective lens. Therefore, one can see the portion of the subject the lens projects on to the film. The only error is that of parallax, which is more or less negligible for a subject beyond about six feet. Apart from this, the view through the peep-sight and the frame will be substantially coincident with the portion of the subject recorded on the film.

When using the frame finder it may be difficult for one to obtain an accurate view of the portion of the subject to be recorded on the film. If the eye is not centered with respect to the rear peep sight, the view through the front frame will appear hazy or obscure. However, one may find it difficult to know exactly when the eye is centered with respect to the peep sight. Hence, the user may not take a picture of what he or she intended.

SUMMARY OF THE INVENTION

The invention solves the above-described problem in a frame finder by eliminating the need for the eye to be centered with respect to the frame finder.

According to the invention a viewfinder for indicating substantially how much of a subject an objective lens projects on to the film in a camera comprises a frame for viewing the portion of the subject to be recorded on the film. The frame includes a lattice like arrangement of spaced light baffles which define relatively small viewing openings between the baffles for viewing the subject through the openings. Each of the light baffles has a length which is sufficient with respect to the optical axis of the objective lens to block from view ambient light reflected to the viewing openings from outside the portion of the subject the lens projects on to the film. Thus when the eye is brought relatively close to the lattice like arrangement the view through the viewing openings will be substantially coincident with the portion of the subject recorded on the film, since the area outside that portion will appear blackened.

If the eye is relatively close to the lattice like arrangement to see through the viewing openings, it is correctly positioned to view the portion of the subject to be recorded on the film. The eye need not be centered with respect to the lattice like arrangement as in the above-described example of the prior art. This is due to the fact that wherever the eye is positioned the light baffles will block from view ambient light reflected to the viewing openings from outside the portion of the subject the lens projects on to the film. Hence, the previous need for the eye to be centered is obviated.

BRIEF DESCRIPTION OF THE DRAWINGS

The invention will be described in connection with the drawings, wherein.

DESCRIPTION OF THE PREFERRED EMBODIMENT

The invention is disclosed in connection with a conventional 35 mm camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
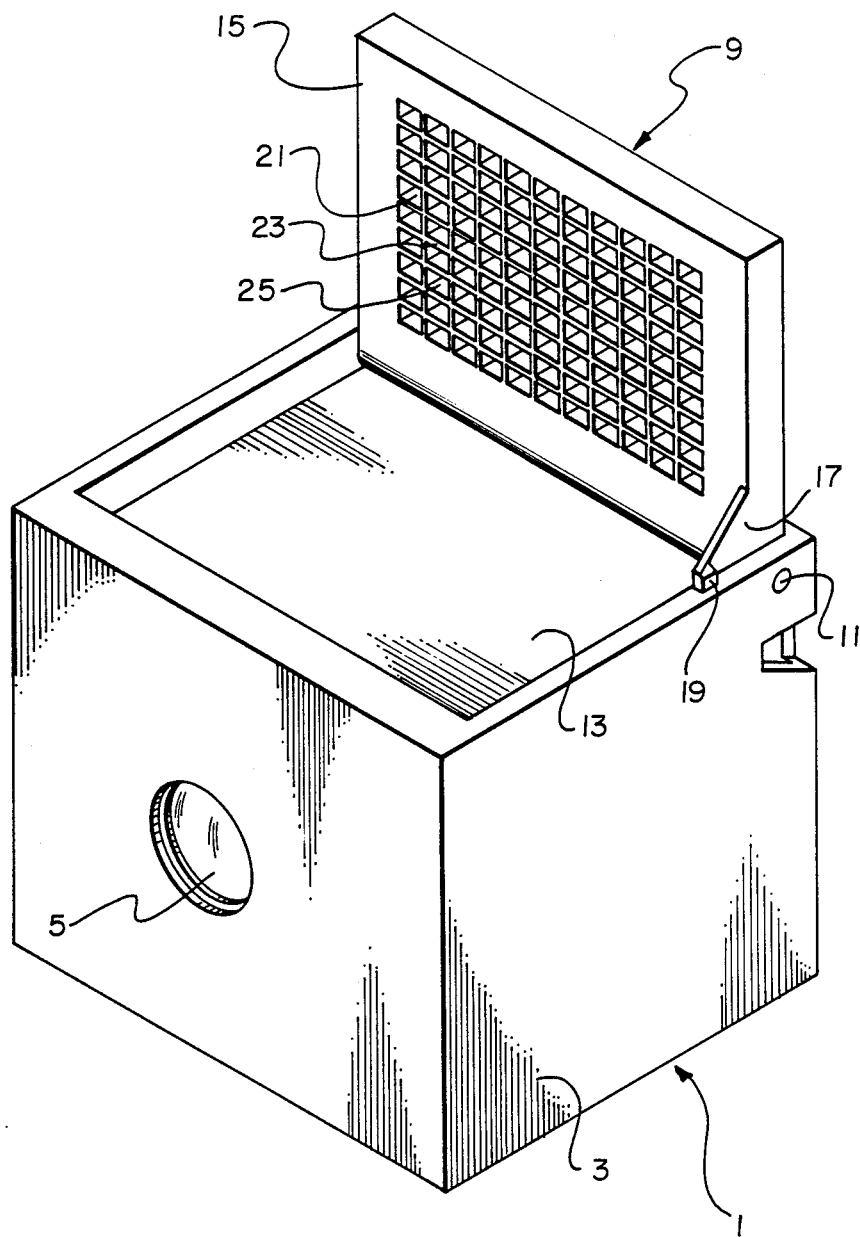
FIG. 1 is a front perspective view of a camera including a viewfinder constructed in accordance with a preferred embodiment of the invention.
Figure 2:
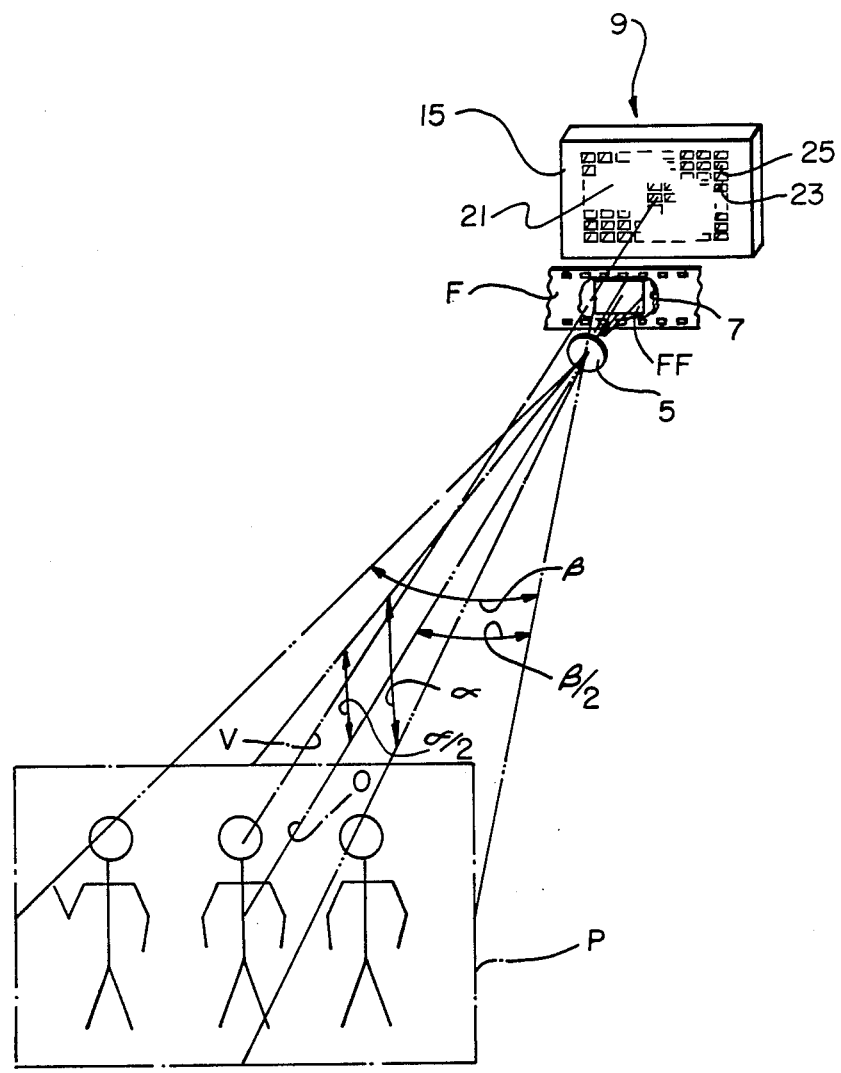
FIG. 2 is a diagrammatic perspective view of the objective lens and the film in the camera, the viewfinder, and the portion of the subject the lens projects on to the film, illustrating the respective taking angles ($\alpha$ and $\beta$) of the lens in a vertical plane and a horizontal plane.

Referring now to the drawings and in particular to FIGS. 1 and 2, there is shown a 35 mm still camera 1 comprising a camera body 3 and an objective (taking) lens 5. The objective lens 5 as illustrated in FIG. 2 projects a portion of the subject to be photographed on to a film frame FF of a 35 mm filmstrip F in the camera body 3. The film frame FF according to convention has a 2:3 aspect ratio of width to height, is dimensioned approximately 24×36 mm, and is defined by an exposure window 7 in the camera body 3. Preferably the lens 5 has a focal length of 36 mm, and it has a taking field of view (limited by the exposure window 7) which includes respective taking angles $\alpha$ and $\beta$ in a vertical plane and a horizontal plane. The taking angles $\alpha$ and $\beta$ of the lens 5 define corresponding limits of the portion P of the subject projected by the lens on to the filmstrip F.

A flip-up viewfinder 9 as shown in FIG. 1 is connected by a pivot pin 11 to the camera body 3 for swinging movement about the pin between an erect viewing position above the camera body and a folded storage position (not illustrated) within a cavity 13 at the top of the camera body. The viewfinder 9 includes a rectangular frame 15 for viewing the portion P of the subject the objective lens 5 projects on to the filmstrip F and a resiliently flexible arm 17 having a projection 19 for releasably securing the viewfinder in its erect viewing position.

In the erect viewing position, the viewfinder 9 is disposed with its viewing axis V parallel to the optical axis O of the objective lens 5. See FIG. 2. This causes a framing error commonly referred to as the parallax error. Specifically, it arises from the difference in viewpoint between the frame 15 and the lens 5 - which may be one inch apart. The frame 9, then includes an inch more at the top with a corresponding reduction at the bottom as compared to the lens 5. However, this error is more or less negligible for a subject beyond 6 feet from the lens.

As shown in FIGS. 1 and 2, the frame 15 includes a lattice like (grid) arrangement 21 of spaced light baffles 23 which define relatively small rectangular viewing openings 25 between the baffles for viewing the subject to be photographed. The light baffles 23 may be said to be disposed along uniformly spaced horizontal and perpendicular lines and are relatively thin, flat, non-reflective elements each having the same thickness. The viewing openings 25 are uniform in size and shape and have the same aspect ratio, i.e., 2:3, as the film frame FF. When the viewfinder 9 is in its erect viewing position, the viewing openings 25 have the same orientation with respect to the viewing axis V in a vertical plane as the film frame FF has with respect to the optical axis O in a vertical plane, and they extend in a lengthwise manner parallel to both axes.

Figure 3:
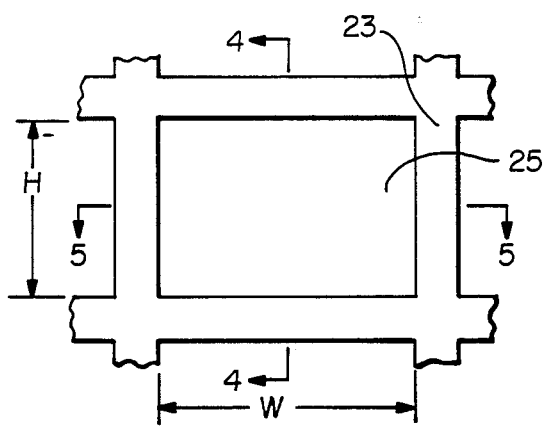
FIG. 3 is an elevation view of one of a plurality of similar viewing openings in the viewfinder, illustrating the relationship of the opening's height (H) to its width (W)
Figure 4:
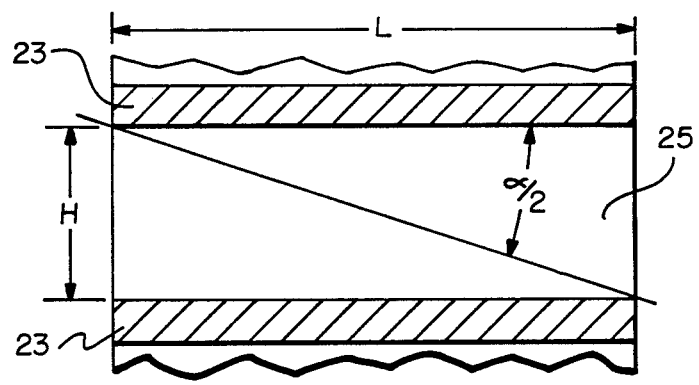
FIG. 4 is a cross-section view of the viewing opening depicted in FIG. 3 as seen in the direction of the arrows from the line 4—4 in FIG. 3, illustrating the relationship of the opening's height (H) to its length (L)
Figure 5:
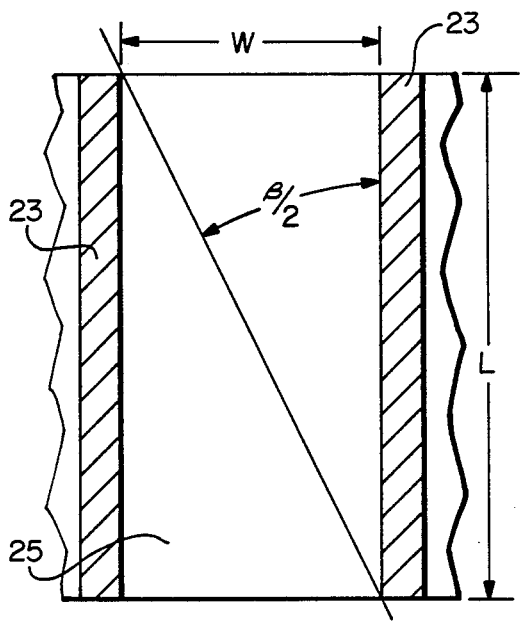
FIG. 5 is a cross-section view of the viewing opening depicted in FIG. 3 as seen in the direction of the arrows from the line 5—5 in FIG. 3, illustrating the relationship of the opening's width (W) to its length (L)

Looking at FIGS. 3–5, it can be seen that each of the viewing openings 25 has a height H, a width W and a length L. Suitable dimensions for the height H, the width W, and the length L are 0.050", 0.075", and 0.150", respectively. These dimensions are chosen such that H/L=tangent $\alpha/2$ and W/L=tangent $\beta/2$, where as described above $\alpha$ and $\beta$ are the respective vertical and horizontal taking angles of the objective lens 5. Thus in the present example $\alpha$=approximately 37° and $\beta$=approximately 53°.

Figure 6:
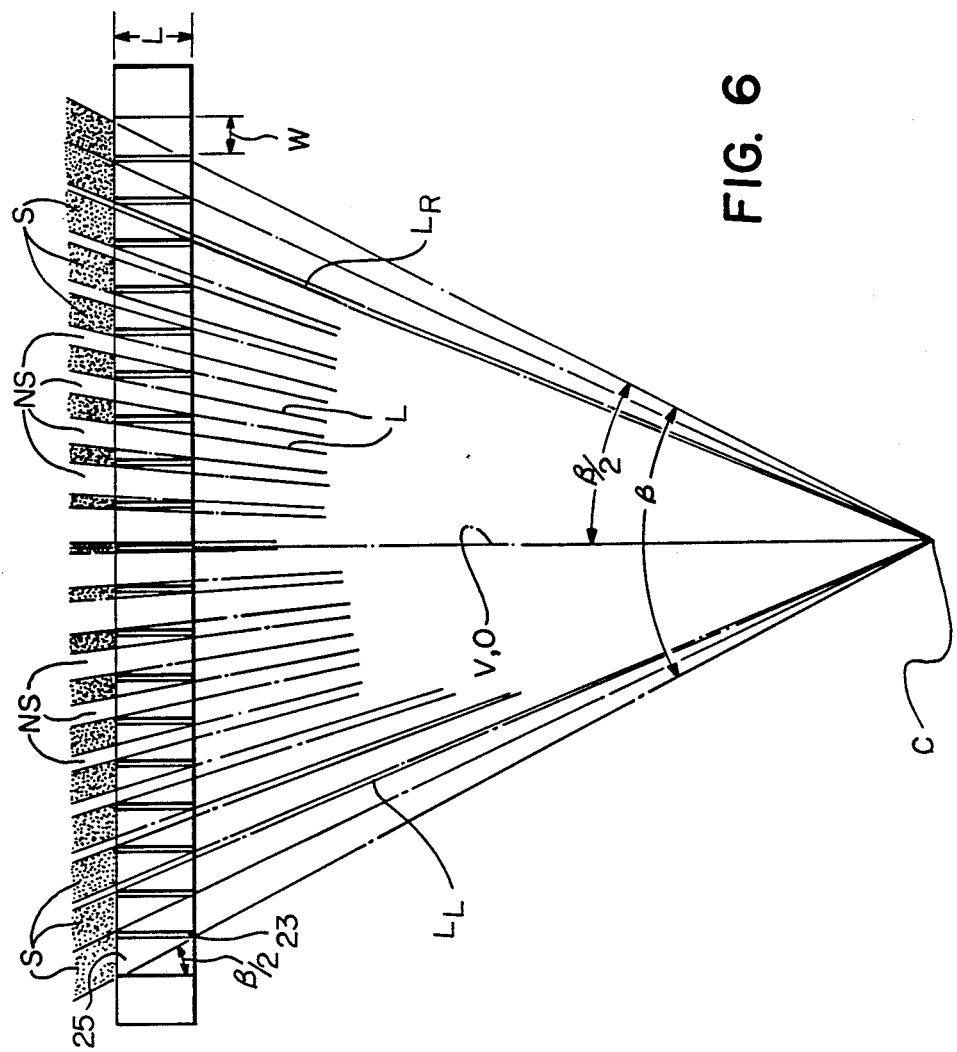
FIG. 6 is a diagrammatic plan view of the lines of sight from the eye through a number of the viewing openings as seen in a horizontal plane.

The length L of the light baffles 23 must be sufficient to block from eye view the ambient light reflected from outside the portion P of the subject the objective lens 5 projects on to the filmstrip F. This principle is illustrated in FIG. 6 wherein there is shown in a horizontal plane parallel to the plane of the taking angle $\beta$ (in FIG. 2) a number of lines of sight L from the center C of the eye to each of the viewing openings 25. Those areas S bounded by adjacent lines of sight L, beyond the viewing openings 25, which are shaded in FIG. 6, indicate areas in which ambient light reflected from the subject to the viewing openings is prevented by the light baffles 23 from reaching the eye. Conversely, those areas NS, bounded by adjacent lines of sight, beyond the viewing openings, which are not shaded in FIG. 6, indicate areas in which ambient light reflected from the subject to the viewing openings passes through the openings to reach the eye. Hence, to the right of the line of sight $L_R$ and to the left of the line of sight $L_L$ in FIG. 6, no ambient light (whatsoever) will reach the eye, since there are only shaded areas S to the right and left of these lines. A corresponding explanation, of course, exists for the lines of sight (not shown) in a vertical plane parallel to the plane of the taking angle $\alpha$ (in FIG. 2).

Figure 7:
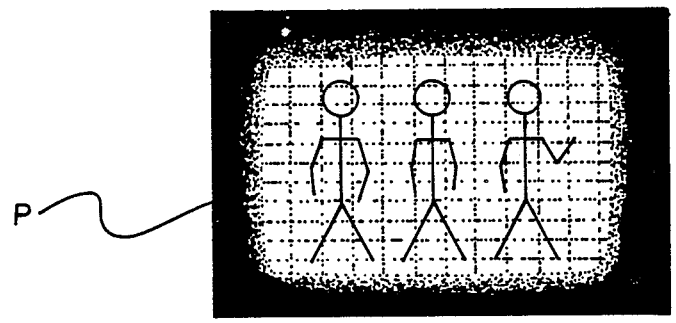
FIG. 7 is an elevation view of the eye view of the subject as seen through the viewing openings.

Since the light baffles 23 have a length L which is sufficient to block from eye view the ambient light reflected from outside the portion P of the subject the objective lens 5 projects on to the filmstrip F, the eye view of the subject through the viewing openings 25 will be as shown in FIG. 7. In FIG. 7, the visible area (non-shaded) has the same aspect ratio of width to height as the film frame FF, i.e., 2:3, and it is substantially coincident with the portion P of the subject the lens 5 projects on to the filmstrip F.

When the eye is relatively close to the viewfinder 9 to see through the viewing openings 25, the lattice like arrangement 21 is larger than the immediate field of view of the eye. Thus the eye will be correctly positioned to view the portion P of the subject to be recorded on the filmstrip F. The eye need not be centered with respect to the lattice like arrangement 21 as in the above-described example of the prior art. This is due to the fact that wherever the eye is positioned the light baffles 23 will block from view ambient light reflected to the viewing openings 25 from outside the portion P of the subject lens 5 projects on to the filmstrip F. Hence, the previous need for the eye to be centered is obviated.

While the invention has been described with reference to a preferred embodiment, it will be understood that various modifications may be effected within the ordinary skill in the art without departing from the scope of the invention.

I claim:

1. A viewfinder for indicating substantially how much of a subject an objective lens projects on to the film in a camera, wherein said viewfinder comprises a frame for viewing the portion of the subject to be recorded on the film and is characterized in that:

said frame includes a lattice like arrangement of spaced light baffles defining relatively small viewing openings between said baffles for viewing the subject through said openings;

said light baffles having a length sufficient with respect to the optical axis of the objective lens to block from view ambient light reflected to said viewing openings from outside the portion of the subject the lens projects on to the film, whereby when an eye is relatively close to said lattice like arrangement the view through said openings will be substantially coincident with the portion of the subject recorded on the film.

2. A viewfinder as recited in claim 1, wherein when an eye is relatively close to said lattice like arrangement the lattice like arrangement is larger than the field of view of the eye.

3. A view finder as recited in claim 1, wherein said viewing openings are uniform in shape.

4. A viewfinder as recited in claim 3, wherein said viewing openings are uniform in size.

5. A viewfinder as recited in claim 1, wherein each of said viewing openings has the same aspect ratio as the portion of the subject recorded on the film.

6. A viewfinder as recited in claim 1, wherein said light baffles are disposed along uniformly spaced horizontal and perpendicular lines.

7. A viewfinder as recited in claim 6, wherein said light baffles are relatively thin, flat, non-reflective elements.

8. A viewfinder as recited in claim 1, wherein the objective lens has respective taking angles ($\alpha$ and $\beta$) in a vertical plane and a horizontal plane which define corresponding limits of the portion of the subject the lens projects on to the film and each of said viewing openings has a height (H), a width (W) and a length (L) with the relationship H/L=tangent $\alpha$/2 and W/L=tangent $\beta$/2.

9. A viewfinder as recited in claim 8, wherein the proportion of the width (W) to the height (H) of each of said viewing openings is the same as the aspect ratio of the portion of the subject recorded on the film.

10. A viewfinder as recited in claim 8, wherein the length (L) of each of said viewing openings is greater than the width (W) or the height (H) of each of the viewing openings.

11. A viewfinder as recited in claim 8, wherein each of said viewing openings has the same width (W), the same height (H) and the same length (L).

12. A viewfinder for indicating substantially how much of a subject an objective lens projects on to the film in a camera, the objective lens having respective taking angles ($\alpha$ and $\beta$) in a vertical plane and a horizontal plane which define corresponding limits of the portion of the subject the lens projects on to the film, and said viewfinder comprising a frame for viewing the portion of the subject to be recorded on the film and characterized in that:

said frame includes a lattice like arrangement of spaced light baffles defining relatively small viewing openings between said baffles for viewing the subject through said openings;

each of said viewing openings having a height (H), a width (W) and a length (L) with the relationship H/L=tangent $\alpha$/2 and W/L=tangent $\beta$/2.

* * * * *